United States Patent
Buer (10) Patent No.: US 8,112,787 B2
(45) Date of Patent: Feb. 7, 2012

(54) SYSTEM AND METHOD FOR SECURING A CREDENTIAL VIA USER AND SERVER VERIFICATION

(75) Inventor: Mark Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 1208 days.

(21) Appl. No.: 11/648,647

(22) Filed: Jan. 3, 2007

(65) Prior Publication Data

US 2007/0245148 A1  Oct. 18, 2007

Related U.S. Application Data

(60) Provisional application No. 60/755,419, filed on Dec. 31, 2005.

(51) Int. Cl.
*H04L 9/32* (2006.01)
*H04L 9/00* (2006.01)

(52) U.S. Cl. ............ 726/2; 726/5; 726/9; 713/168; 713/186

(58) Field of Classification Search .......... 713/150, 713/156, 168–173, 175, 181–183, 186, 185; 726/2–5, 9–10, 17–21
See application file for complete search history.

(56) References Cited

U.S. PATENT DOCUMENTS

| | | | | |
|---|---|---|---|---|
| 6,178,409 B1 * | 1/2001 | Weber et al. | ............ | 705/79 |
| 6,990,684 B2 * | 1/2006 | Futamura et al. | ............ | 726/18 |
| 7,406,601 B2 * | 7/2008 | Hamid | ............ | 713/186 |
| 7,409,543 B1 * | 8/2008 | Bjorn | ............ | 713/155 |
| 7,526,798 B2 * | 4/2009 | Chao et al. | ............ | 726/5 |
| 7,565,536 B2 * | 7/2009 | Vassilev et al. | ............ | 713/168 |

* cited by examiner

*Primary Examiner* — Hosuk Song
(74) *Attorney, Agent, or Firm* — Sterne, Kessler, Goldstein & Fox, P.L.L.C.

(57) ABSTRACT

Systems and methods for securing a credential generated by or stored in an authentication token during an attempt to access a service, application, or resource are provided. A secure processor receives a credential from an authentication token and securely stores the credential. The secure processor then verifies the identity of the individual attempting to use the authentication token and cryptographically verifies the identity of the server being accessed. The credential is only released for transmission to the server if both the identity of the individual and the identity of the server are successfully verified. Alternatively, a secure connection is established between the secure processor and the server being accessed and a secure connection is established between the secure processor and a computing device. The establishment of the secure connections verifies the identity of the server. After the secure connections are established, the identity of the user is verified.

21 Claims, 5 Drawing Sheets

SYSTEM AND METHOD FOR SECURING A CREDENTIAL VIA USER AND SERVER VERIFICATION

CROSS-REFERENCE TO RELATED APPLICATIONS

This application claims the benefit of U.S. Provisional Application No. 60/755,419, filed Dec. 31, 2005, which is herein incorporated by reference in its entirety.

FIELD OF THE INVENTION

This application relates generally to data communications and more specifically to information security.

BACKGROUND OF THE INVENTION

Certain types of on-line services and applications are targets for hackers and other malicious individuals attempting to gain access to sensitive user information. This is particularly true for on-line financial applications such as Internet banking, on-line payment sites, and on-line brokerages. Common techniques used by hackers include the installation of viruses, Trojan horses, or spyware on a user's computer, phishing schemes, and man-in-the-middle attacks involving the interception of communication from the user's computer and an external server or device.

Various forms of authentication are used to provide security for on-line transactions. The forms of authentication are generally categorized in three classes: something the user is (e.g., a biometric such as a fingerprint), something the user has (e.g., a security token), and something the user knows (e.g., password). Security is strengthened by using multiple forms of authentication (referred to as "multi-factor" authentication) to verify the identity of a user.

In the various schemes described above, a hacker attempts to access the authentication data (referred to as a "credential") associated with an authentication factor. Because the identity of the server is not authenticated during an access attempt, credentials are susceptible to hacking schemes involving establishment of an illegitimate servers. For example, in a phishing scheme, a user is tricked into entering his authentication credentials into a fake website having the look and feel of the legitimate site. The operator of the phishing website may then use those credentials to access the user's account and/or perform unauthorized transactions.

In man-in-the middle schemes, communication between the user and a server are intercepted. In other words, the user is led to believe that he is in direct communication with the server and vice versa. In actuality, the "man-in-the-middle" establishes separate connections with the user's device and the server. As a result, the man-in-the middle software logs all communication between the user's device and the server. Thus, credential sent in the clear over the communications connection between the user's device and the server are vulnerable.

Malicious code may also be surreptitiously installed on a user's computer. This malicious code may cause a user's keystrokes to be monitored or may cause communications to be intercepted. Thus, credentials stored in the clear on a user's device are vulnerable to certain forms of malicious code.

What is therefore needed are systems and methods for securing an authentication credential via verification of the user and verification of the server.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

Figure 1:
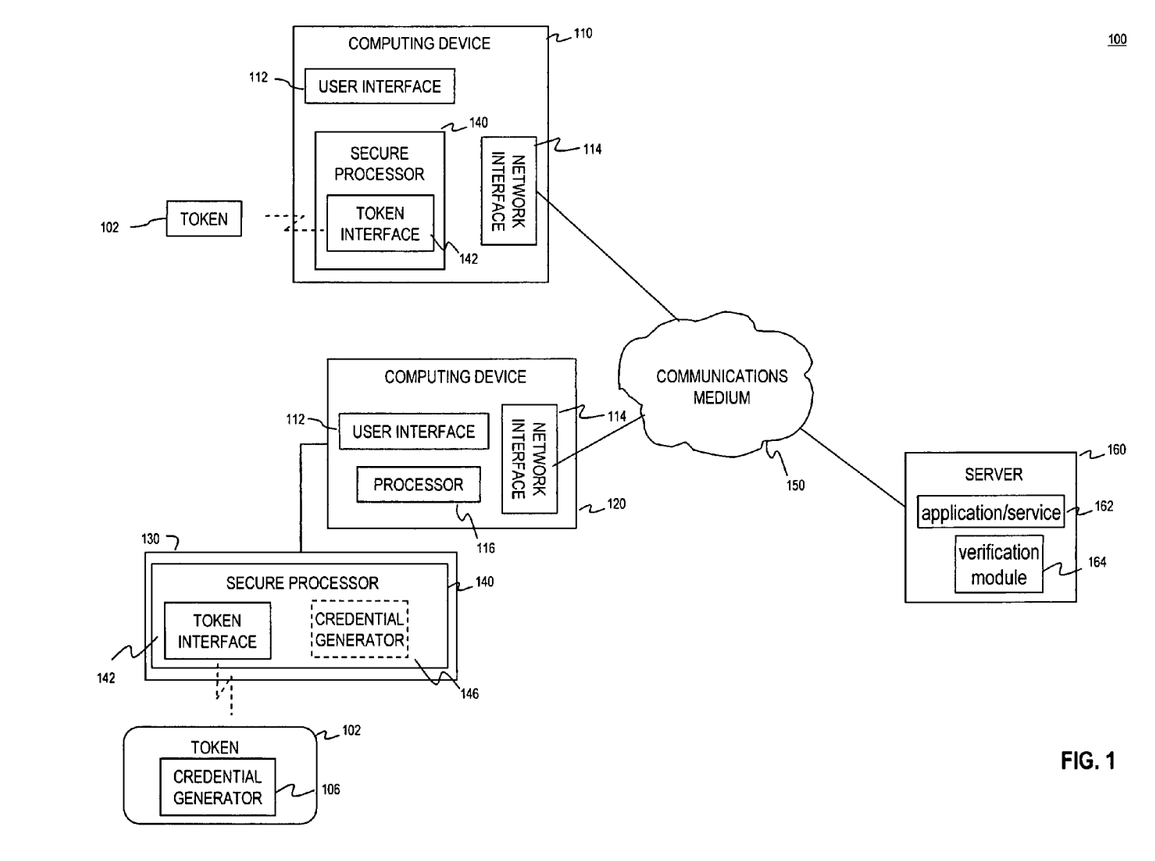
FIG. 1 is an exemplary operating environment, according to embodiments of the present invention.

FIG. 1 is an exemplary operating environment 100 for securing a credential via user and server verification, according to embodiments of the present invention. Exemplary operating environment 100 includes a plurality of tokens 102, computing devices 110 having integrated secure processors, a plurality of computing devices 120, a plurality of external secure processing devices 130, a communications network 150, and a plurality of servers 160.

Token 102 is a portable module which is issued by a provider of a service, application, or resource. For example, a financial institution may issue a user a security token to be used to make financial transactions over the Internet. Token 102 is configured to provide the authentication data necessary for the user to access to the requested resource, service, and/or application offered by the provider.

Token 102 may be implemented in various physical forms depending on the needs of the respective applications. For example, token 102 may be in a form that is easy to carry, similar to a plastic credit card, smartcard, building access card, fob, etc. Also, a token may take a form that may be attached to or incorporated into another article. Examples of tokens 102 include, without limitation, smartcards, credit cards, dongles, badges, biometric devices such as fingerprint readers, mobile devices such as wireless phones, or PDAs.

Token 102 may include an optional credential generator 104. In an embodiment, credential generator 104 generates a random or pseudo random value (often referred to as a one-time password). The value may change every transaction or may change over time (e.g., at specific intervals or randomly). If token 102 is a smartcard, credential generator 106 may be configured to generate a monotonically increasing value for each transaction attempted by the user of the smartcard (referred to herein as a "transaction code"). In an alternate embodiment, token 102 stores a fixed credential in memory (not shown). The fixed credential may be a shared secret, a private key, or a secret key.

Computing device 110 includes a user interface 112, a network interface 114, and an integrated secure processor 140. Computing device 120 includes a user interface 112, a network interface 114, and a processor 116. Unlike computing device 110, computing device 120 does not have an integrated secure processor 140. Both computing device 110 and computing device 120 may include an interface for coupling with an external secure processing device 130 (interface not shown). Computing device 110 or 120 is any device with a processor including, but not limited to, a personal computer, a laptop, a wireless phone, a personal digital assistant (PDA), or a personal entertainment device.

User interface 112 is configured to enable a user to interact with computing device 110 or 120 and to request access to remote applications and services. User interface 112 may include one or more output devices including, but not limited to, a display, indication lights, and a speaker. In addition, user interface 112 may include one or more input devices including, but not limited to, a keypad, button, pointing device, touch screen, audio device, and a soft-key-based menu. For example, authentication data such as a log-in/password pair may be entered via user interface 112.

Network interface 114 is configured to enable computing device 110 or 120 to communicate with network 150. In an embodiment, network interface 114 is a wired interface. In an additional or alternative embodiment, network interface 114 is a wireless interface.

Secure processing device 130 is a stand-alone device which may be coupled to computing device 110 or 120 to provide secure processing capabilities. Secure processing device 130 may be a dongle (e.g., a USB-based dongle) or any other device which can be coupled to a computing device. Secure processing device 130 includes a secure processor 140.

Secure processor 140 provides the required cryptographic operations to encrypt, decrypt, and/or authenticate data that is sent or received by the secure processor. Additionally, secure processor 140 securely maintains information received from token 102 (e.g., credential) and releases the information only after the user and server are verified. In an embodiment, secure processor 140 includes a credential generation module 144. Credential generation module 144 is configured to generate a credential. In an embodiment, a credential is generated using a transaction code received from token 102. Alternatively, credential generation module 144 uses seed information generated by or stored in secure processor 140 to generate a credential.

Secure processor 140 may comprise a processor, memory, dedicated cryptographic hardware, and a token interface 142. In addition, secure processor 140 may incorporate other security mechanisms. For example, secure processor 140 may be configured to securely execute the code to release or generate the credential. For example, secure processor 140 may be configured to only execute secure (e.g., authenticated) code. In an embodiment, secure processor 140 is designed to conform to a security specification relating to, for example, FIPS or TPM.

A security boundary associated with secure processor 140 may be established, for example, using hardware and/or cryptographic techniques. Hardware techniques for providing a security boundary may include, for example, placing components within a single integrated circuit. In addition, one or more integrated circuits may be protected by a physical structure using tamper evident and/or tamper resistant techniques such as epoxy encapsulation. Encryption techniques for establishing a security boundary may include, for example, encrypting sensitive information before it leaves secure processor 140. For this purpose, secure processor 140 may use one or more cryptographic processors and store the associated encryption/decryption keys in a secure memory internal to secure processor 140.

Secure processor 140 stores user authentication data such as a user identifier, password, PIN, shared secret, and/or user biometric template and also temporarily stores the credential received from the token. This data may be stored in memory within the secure processor 140 either within the security boundary or external to the security boundary. Alternatively, secure processor 140 may store the information in an external memory in an encrypted form. The key(s) used to encrypt, decrypt, and/or authenticate the externally stored information may be maintained with the security boundary of secure processor 140.

In an embodiment, secure processor 140 includes the capabilities to generate an asymmetric key pair (public/private key pair). In an alternative embodiment, the private key is "securely injected" into the secure processor 140. In the secure injection embodiment, the entity which injects the private key must "forget" the private key to ensure the integrity and privacy of the asymmetric key pair. In either embodiment, the private key does not leave the hardware security boundary of processor 140 unless encrypted. An exemplary system and process for securely generating an asymmetric key pair or securely injecting a private key into a processor is described in detail in U.S. Patent Publication No. 2005/0166051, entitled "System and Method for Certification of a Secure Platform," which is incorporated herein by reference in its entirety.

Token interface 142 is configured to communicate with token 102. In an embodiment, token interface 142 is a contact-based interface. In a contact-based interface, the secure processor 140 has one or more electrical connectors which make contact with electrical connectors on token 102 or smartcard 104. In addition or alternatively, token interface 142 is contactless interface. For example, secure processor 140 may communicate with a token 102 or smartcard 104 using radio frequency identification (RFID) induction technology, low frequency RFID, or near field communication (NFC) such as high frequency RFID, in accordance with, for example, ISO 14443 and ISO 15693. In an embodiment, token interface 142 includes a smartcard reader.

In some embodiments, token interface 142 resides within the security boundary associated with secure processor 140. In these embodiments, information received from token 102 such as the credential may be securely maintained within secure processor 140. Additionally, the credential generated by the token 102 may be encrypted before it is communicated outside the chip within which secure processor 140 is implemented. As a result, information from the token 102 remains secured, even if computing device 110 or 120 is compromised.

In an embodiment, computing devices 110 or 120 (or secure processor 140) directly access one or more servers 160 or 170 via a communications medium 150. Communications medium 150 may be a public data communications network such as the Internet, a private data communications network, the Public Switched Telephone Network (PSTN), a wireless communications network, or any combination thereof. The interface between the computing devices 110, 120 and communications network 150 can be a wireless interface or a wired interface.

Server 160 hosts one or more resources, applications, and/or services 162 to which a user is enrolled. Server 160 may comprise hardware and/or software configured to provide a resource, service, or application. For example, a server may include a processing system that handles access requests, authenticates the requestor, and facilitates access to the requested resource, service, or application.

In an embodiment, server 160 includes a verification module 164. Verification module 164 is configured to validate that the credential received is the expected credential. Verification module 164 includes an algorithm corresponding to the algorithm used to generate the code.

Figure 2:
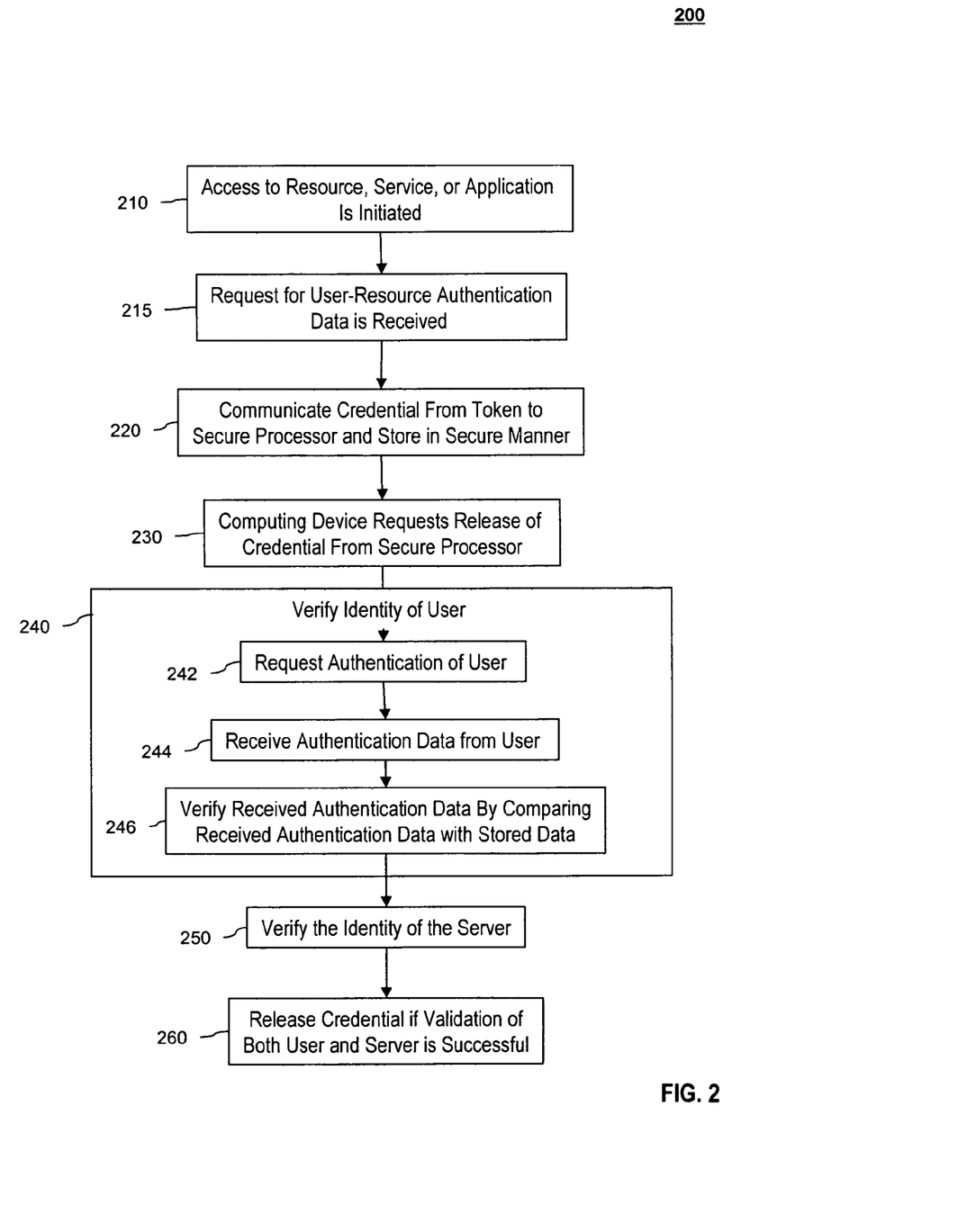
FIG. 2 depicts a flowchart of a method for securing a credential via user and server verification, according to embodiments of the present invention.

FIG. 2 depicts a flowchart 200 of a method for securing a credential via user and server verification, according to embodiments of the present invention. Flowchart 200 is described with continued reference to the exemplary operating environment depicted in FIG. 1. However, flowchart 200 is not limited to that embodiment. Note that some of the steps in flowchart 200 do not necessarily have to occur in the order shown.

Prior to step 210, a user enrolls or sets-up an account with a service provider. In an illustrative example, the service provider is a financial institution such as a bank, brokerage, credit union, etc. The service provider issues a token for use as an authentication mechanism when the user attempts to access certain resources or applications. At this point, or alternatively at the time of manufacture, the token is programmed to generate a credential or to store a fixed credential.

In step 210, a user initiates access to a resource, service or application 162 (referred to herein as "resource" for ease of description) provided by or on-behalf of the service provider. In an embodiment, the resource allows the user to access his or her financial information or perform financial transactions over a public data network (e.g., Internet). A user may access service or application 162 via any suitable computing device. For example, a user may use a standard web browser to access a webpage through which a user can gain access to the desired application or service.

Alternatively, in step 210, a user initiates access to a resource, service, or application local to the computing device. For example, the user may initiate access to the computing device itself.

In step 215, server 160 requests user-resource authentication data from the user. The user-resource authentication data includes a credential generated by the token 102 (or optionally generated by secure processor 140) and optionally log-in and password data established for the specific resource.

By requiring a user to present the credential in addition to the log-in and password, a person who gained access to the log-in and password data would not be able to access the resource at a later time because he would not have access to the additional authenticator (i.e., the credential). Also, a person who gained access to the log-in, password, and a credential value (e.g., via a phishing scheme, spyware, or man-in-the-middle attack) would not be able to log-in to the resource at a later time because the credential value varies randomly or pseudo randomly. Accordingly, at most, an unauthorized user may be able to use the token to initiate one unauthorized access attempt using the data. Subsequent access attempts would be denied.

In step 220, a credential is communicated from token 102 to secure processor 140 and stored in a secure manner. The credential may be a one-time password generated by token 102, a transaction code generated by a smartcard token, or a static credential stored within token 102. In an embodiment the credential is not displayed by token 102. Communication is initiated by bringing token 102 into contact or into proximity of token interface 112.

In step 230, computing device 110 or 120 requests release of the credential from secure processor 140. The credential is only released if the identity of the user and the server are both verified.

In step 240, secure processor 140 verifies the identity of the user. As would be appreciated by persons of skill in the art, any technique for verifying the identity of a user can be used. Step 240 includes steps 242-246.

In step 242, secure processor 140 requests authentication of the user. For example, secure processor 140 may cause computing device 110 or 120 to request a password, PIN, or shared secret from the user. In an alternative embodiment, secure processor 140 may cause computing device 110 or 120 to request a current biometric scan of the user. Note that the user authentication data requested by secure processor 140 in step 242 may be different than the user authentication data requested by the server 160 in step 215.

In step 244, secure processor 140 receives authentication data from the user.

In step 246, secure processor 140 verifies the received authentication data by comparing the received authentication data with the user authentication data stored in secure processor 140 (or securely stored externally to secure processor 140).

In step 250, secure processor 140 verifies the identity of server 160. A variety of techniques can be used to verify the identity of server 160. For example, the identity of the server can be validated using public key infrastructure (PKI). Exemplary PKI validation is described below in reference to FIG. 3. In an additional example, the identity of the server can be verified using a challenge/response mechanism. An exemplary challenge/response mechanism is described below in reference to FIG. 4. In a further example, the identity of the server can be verified using the Transport Layer Security (TLS) or Secure Socket Layer (SSL) protocol.

In step 260, secure processor 140 releases the credential if validation of both the user and server is successful. In an embodiment, secure processor 140 generates the credential. In an alternative embodiment, the credential is received from the token and then released.

Figure 3:
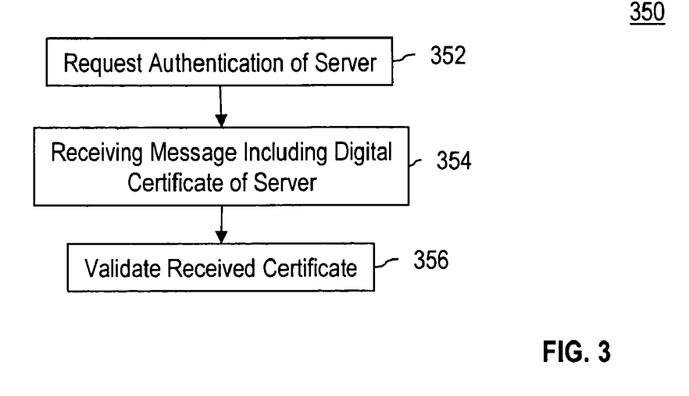
FIG. 3 depicts a flowchart of an exemplary method for authenticating a server using PKI, according to embodiments of the present invention.

FIG. 3 depicts a flowchart 350 of an exemplary method for verifying the identity of a server using public key infrastructure certificates, according to embodiments of the present invention. Flowchart 350 is described with continued reference to the illustrative system of FIG. 1. However, flowchart 350 is not limited to that embodiment. Note that some steps in flowchart 350 do not have to occur in the order shown.

Prior to step 352, an asymmetric key pair (e.g., public/private key pair) and a digital certificate are generated for server 160. The digital certificate binds the identity of the certificate owner (i.e., server 160) to a public/private key pair. The digital certificate includes the public key of server 160, a name or other identifier for secure processor, an expiration date, serial number, and identification of organization that issued the certificate. The certification authority signs the digital certificate using its private key. As would be recognized by persons of skill in the art, any technique for generating a signed certificate can be used with the present invention. Note that the public key of the certification authority must be publicly available to enable validation of the secure processor certificate.

In addition, prior to step 352, secure processor 140 may obtain and store the public key for server 160. Alternatively, the secure processor obtains the public key for server 160 as needed.

In step 352, secure processor 140 requests authentication of server 160.

In step 354, server 160 transmits a message including its digital certificate to server 160. Note that the message in the exchange of step 352 between server 160 and secure processor 140 may include additional information to deter man-in-the-middle and replay attacks.

In step 356, secure processor 140 validates the received certificate. In step 356 (or prior to step 356), secure processor 140 obtains the public key of the certification authority which issued the certificate to server 160. Secure processor 140 then uses the public key of the certification authority to verify the signature included with the digital certificate. If the certificate is authentic, operation proceeds to step 260.

Figure 4:
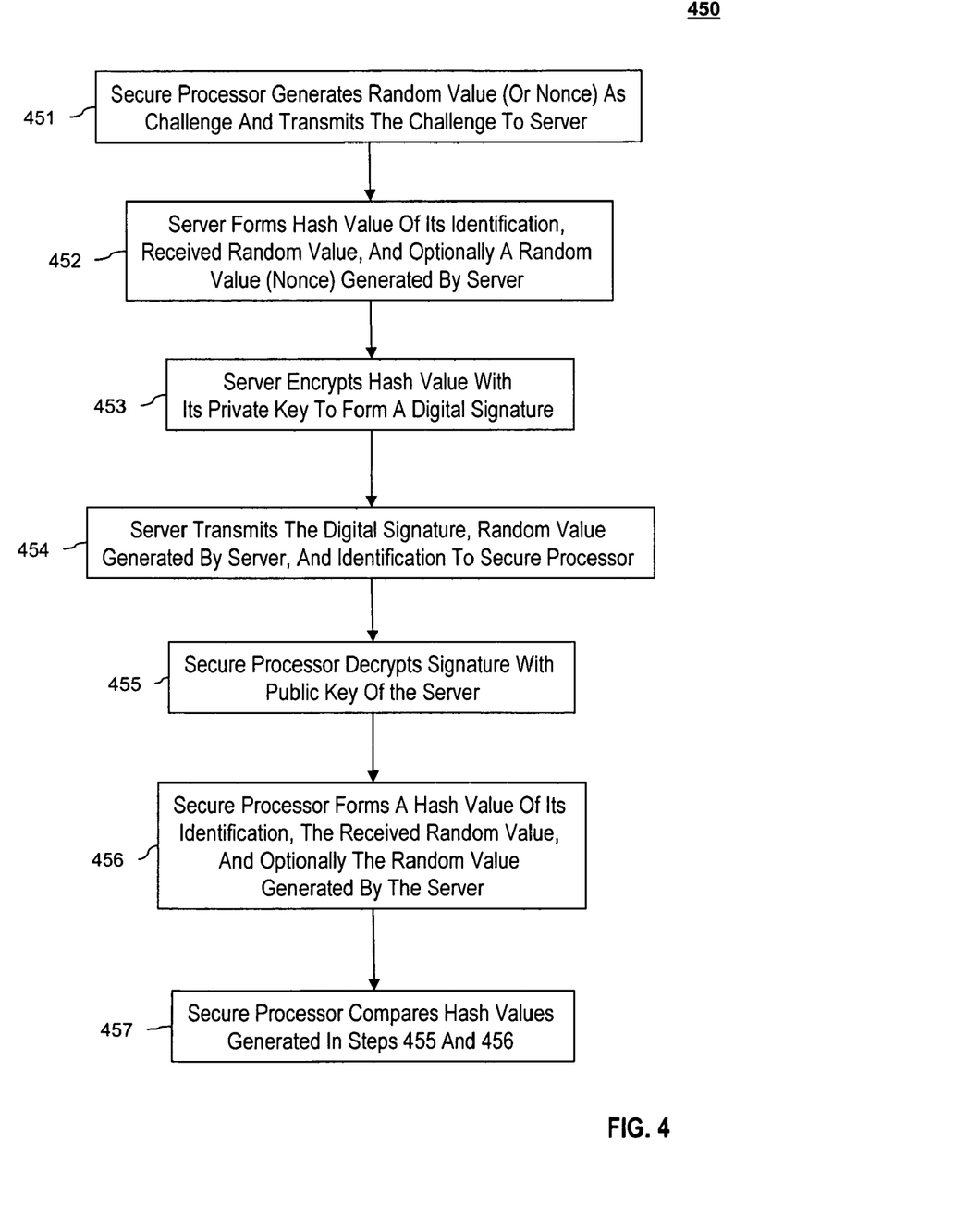
FIG. 4 depicts a flowchart of an exemplary method for verifying a server using a challenge/response protocol, according to embodiments of the present invention.

FIG. 4 depicts a flowchart 450 of an exemplary method for verifying the identity of a server using a challenge/response protocol, according to embodiments of the present invention. Flowchart 450 is described with continued reference to the exemplary operating environment depicted in FIG. 1. However, flowchart 450 is not limited to that embodiment. Note that some of the steps in flowchart 450 do not necessarily have to occur in the order shown.

In step 451, secure processor 140 generates a random value (or nonce) as a challenge and transmits the challenge to server 160.

In step 452, server 160 forms a hash value of its identification, the received random value, and optionally a random value (or nonce) generated by server 160.

In step 453, server 160 encrypts the hash value with its private key to form a digital signature.

In step 454, server 160 transmits the digital signature, random value generated by server 160 (server nonce), and identification to secure processor 140.

In step 455, secure processor 140 decrypts the signature with the public key for server 160. The public key may have been previously loaded into secure processor 140 (e.g., from a certificate generated by a server than authorized use of token). Alternatively, secure processor 140 may obtain the public key from a public directory when the challenge/response protocol is initiated.

In step 456, secure processor 140 forms a hash value of the identification, the generated random value, and optionally the server nonce. Steps 445 and 446 may occur substantially in parallel.

In step 457, secure processor 140 compares the hash values generated in steps 455 and 456. If the two values match, server 160 is successfully authenticated.

The embodiment described in FIG. 4 has advantages in that the challenge is validated in real-time. For example, the user of currently generated random numbers helps to ensure that a previously issued challenge is not being replayed by an unauthorized server in an attempt to obtain the current token value. As would be appreciated by persons of skill in the art, other challenge/response protocols can be used with the present invention.

Figure 5:
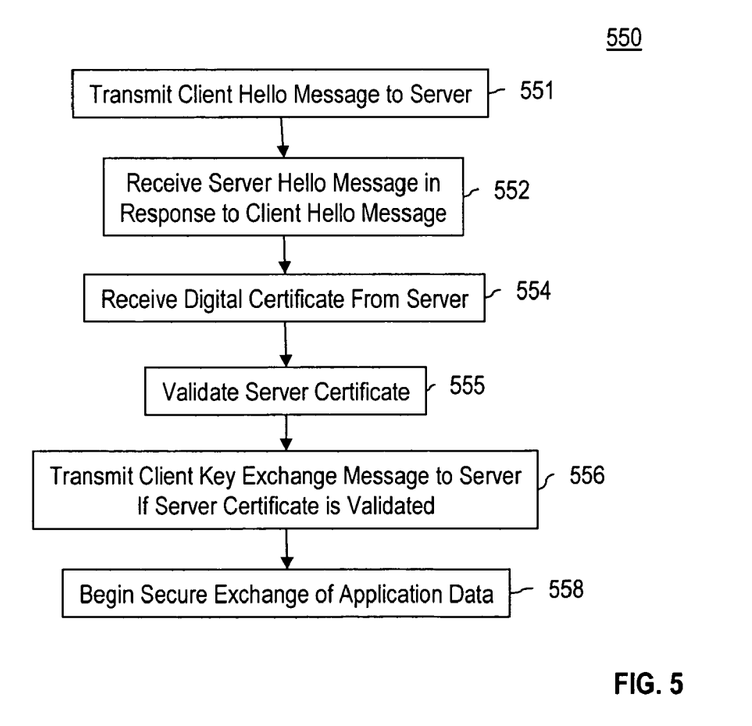
FIG. 5 depicts a flowchart of an exemplary method for verifying a server using transport layer security (TLS) or secure sockets layer (SSL) protocols, according to embodiments of the present invention.

FIG. 5 depicts a flowchart 550 of an exemplary method for verifying the identity of a server using transport layer security (TLS) or secure sockets layer (SSL) protocols, according to embodiments of the present invention. Flowchart 550 is described with continued reference to the exemplary operating environment depicted in FIG. 1. However, flowchart 550 is not limited to that embodiment. Note that some of the steps in flowchart 550 do not necessarily have to occur in the order shown.

Transport layer security (TLS) and secure sockets layer (SSL) are cryptographic protocols for providing secure communication. SSL is the predecessor of TLS. TLS and SSL are used for Internet applications and services such as web applications and e-mail. Flowchart 550 is intended to apply to both TLS and SSL protocols. As would be appreciated by persons of skill in the art, the implementation of flowchart 550 for TLS may vary from the implementation for SSL.

In step 551, secure processor 140 transmits a client hello message to server 160. The client hello message includes a time stamp, a random number, and a CipherSuite list. The CipherSuite list includes combinations of cryptographic algorithms supported by secure processor 140 in order of preference. In addition, each CipherSuite includes a key exchange algorithm, a bulk encryption algorithm (including secret key length) and a message authentication code (MAC) algorithm. The client hello message may also include a list of compression algorithms supported by secure processor 140 in order of preference.

In step 552, server 160 responds to the client hello message with a server hello message if an acceptable set of algorithms was provided in the client hello message. The server hello message includes a random number (independently generated from random number in client hello message) and a CipherSuite. The CipherSuite is a single cipher suite selected by the server from the list of cipher suites included in the client hello message. The server hello message may also include a compression method indicating the single compression algorithm selected by the server from the list of compression methods in the client hello message.

In step 554, server 160 transmits its digital certificate. The type and format of the digital certificate is determined by the selected cipher suite's key exchange algorithm. The server may optionally send a server key exchange message following the certificate message if the certificate message does not contain adequate information to allow the client to exchange a premaster secret. The server may also optionally transmit in this step a request for secure processor's 140 certificate.

In step 555, secure processor 140 validates the provided certificate.

In step 556, secure processor 140 transmits a client key exchange message if the provided server certificate is validated. With the client key exchange message, the premaster secret is set. For example, if RSA is being used for key agreement and authentication, the premaster secret is encrypted using the server's public key from the server's certificate or a temporary key provided in the server key exchange message and sent in the client key exchange message. If a different algorithm is being used, parameters may be sent in the client key exchange message which allow each side to agree upon the premaster secret. Note that in step 546, if secure processor's 140 certificate was requested, a client certificate message is sent prior to the transmission of the client key exchange message.

In step 558, secure processor 140 and server 160 begin to securely exchange application data.

Figure 6:
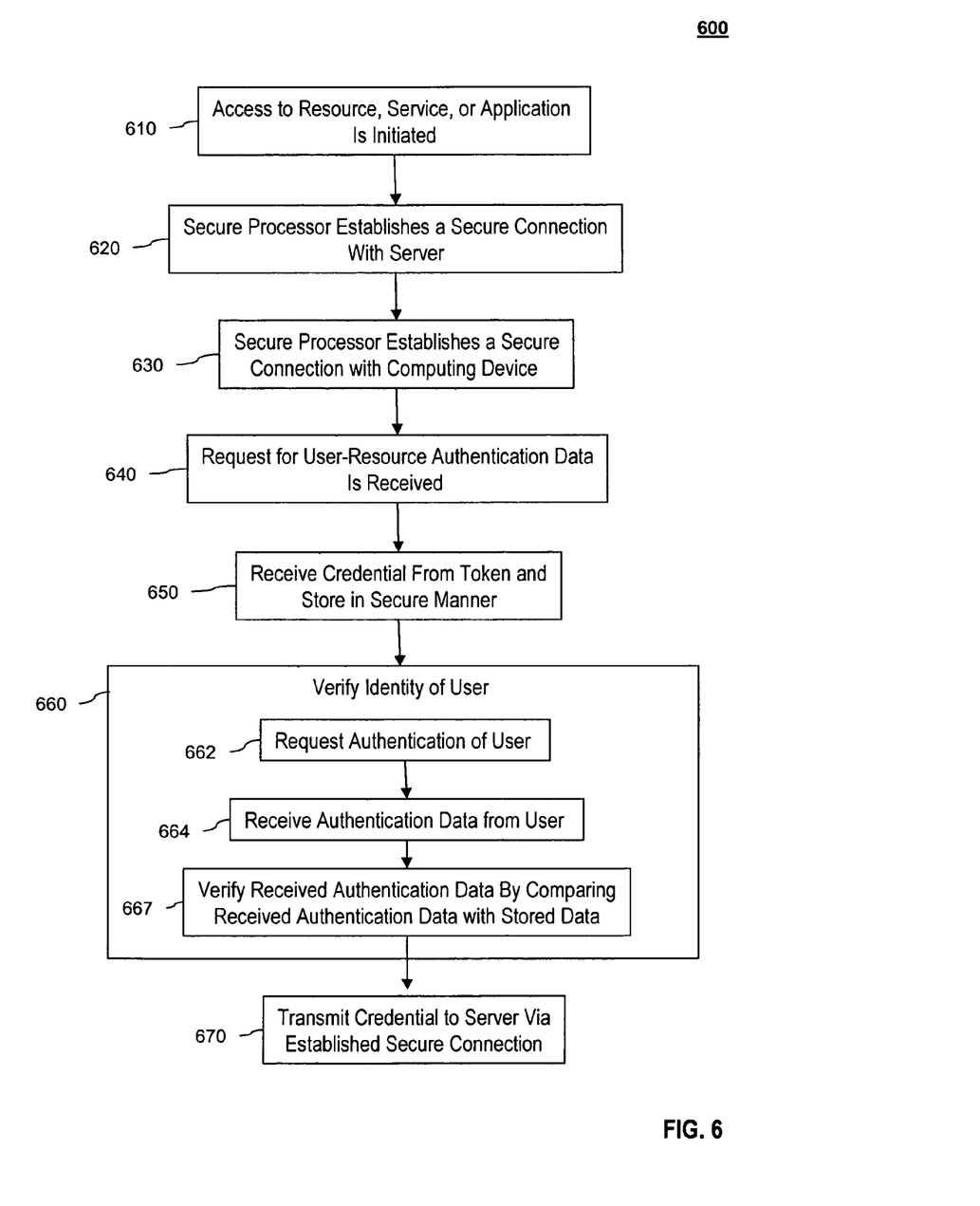
FIG. 6 depicts a flowchart of a method for securing a credential via user and server verification, according to embodiments of the present invention.

FIG. 6 depicts a flowchart 600 of a method for securing a credential via user and server verification, according to embodiments of the present invention. In the method of FIG. 6, secure processing device 130 acts as an TLS or SSL proxy establishing an TLS or SSL connection with computing device 120 and a separate TLS or SSL connection with server 160. In this method, secure processing device 130 may, in effect, perform some of the functionality of a web browser.

Flowchart 600 is described with continued reference to the exemplary operating environment depicted in FIG. 1. However, flowchart 600 is not limited to that embodiment. Note that some of the steps in flowchart 600 do not necessarily have to occur in the order shown.

In step 610, a user initiates access to a resource, service or application 162 (referred to herein as "resource" for ease of description) provided by or on-behalf of the service provider. In an embodiment, the resource allows the user to access his or her financial information or perform financial transactions over a public data network (e.g., Internet). A user may access service or application 162 via any suitable computing device. For example, a user may use a standard web browser to access a webpage through which a user can gain access to the desired application or service.

In step 620, secure processor 140 in secure processing device 130 establishes a secure connection with server 160. For example, computing device 120 may request that secure processor 140 request a secure connection based on the web site address entered by the user. In an embodiment, the secure connection is established using TLS or SSL. An exemplary method for establishing a secure connection using TLS or SSL is described above in reference to FIG. 5.

In step 630, secure processor 140 in secure processing device 130 establishes a secure connection with computing device 120. In an embodiment, the secure connection is established using TLS or SSL. An exemplary method for establishing a secure connection using TLS or SSL is described above in reference to FIG. 5.

In step 640, server 160 requests user-resource authentication data from the user. The user-resource authentication data includes a credential generated by the token 102 (or optionally generated by secure processor 140) and optionally log-in and password data established for the specific resource.

In step 650, a credential is communicated from token 102 to secure processor 140 in secure processing device 130 and stored in a secure manner. The credential may be a one-time password generated by token 102, a transaction code generated by a smartcard token, or a static credential stored within token 102. Communication is initiated by bringing token 102 into contact or into proximity of token interface 112.

In step 660, secure processor 140 verifies the identity of the user. As would be appreciated by persons of skill in the art, any technique for verifying the identity of a user can be used. Step 660 includes steps 662-667.

In step 662, secure processor 140 requests authentication of the user via the established secure connection with computing device 120. For example, secure processor 140 may cause computing device 110 or 120 to request a password, PIN, or shared secret from the user. In an alternative embodiment, secure processor 140 may cause computing device 110 or 120 to request a current biometric scan of the user. Note that the user authentication data requested by secure processor 140 in step 242 may be different than the user authentication data requested by the server 160 in step 640.

In step 664, secure processor 140 receives authentication data from the user via the established secure connection.

In step 667, secure processor 140 verifies the received authentication data by comparing the received authentication data with the user authentication data stored in secure processor 140 (or securely stored externally to secure processor 140).

In step 670, secure processor 140 transmits the credential to server 160 via the established secure connection between secure processing device 130 and server 160 if validation of the user is successful. In an embodiment, secure processor 140 generates the credential. In an alternative embodiment, the credential is received from the token. Note that in this embodiment, secure processor 140 verified the identity of the server when the TLS or SSL connection was established.

An advantage of the approach of FIG. 6 is that the credential is never presented in the clear. Instead, the credential is only sent between secure processor and server via a secure connection. Also, the credential is not sent to user's computing device 120. Therefore, the credential will not be compromised by any malicious code operating on the user's computing device.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for securing a credential during an attempt to access a service hosted on a server, comprising:
   (a) receiving, in a secure processor, the credential from an authentication token;
   (b) verifying the identity of an individual attempting to use the authentication token to access the service;
   (c) cryptographically verifying the server hosting the service; and
   (d) releasing the credential for transmission to the server if the identity of the individual is successfully verified and the server is successfully verified.

2. The method of claim 1, wherein step (b) includes:
verifying authentication data entered by the individual.

3. The method of claim 2, wherein the authentication data includes a password.

4. The method of claim 2, wherein the authentication data includes a shared secret.

5. The method of claim 2, wherein the authentication data includes a biometric template of the individual.

6. The method of claim 1, wherein step (c) includes:
receiving a message including a digital certificate of the server, wherein the digital certificate includes a digital signature; and
validating the received digital certificate by verifying the digital signature with a public key of the server.

7. The method of claim 1, wherein step (c) includes:
(i) transmitting a random value as a challenge to the server;
(ii) receiving a digital signature from the server, wherein the digital signature is a hash value encrypted using a private key of the server and the hash value includes a hash of a server identifier and the random value;
(iii) decrypting the digital signature with a public key of the server to obtain the hash value;
(iv) generating a hash value including a hash of the server identifier and the random value; and
(v) comparing the decrypted hash value and the generated hash value.

8. The method of claim 1, wherein step (c) includes:
(i) transmitting a client hello message to the server, wherein the client hello message includes a listing of cryptographic algorithms supported by the secure processor;
(ii) receiving a server hello message in response to the client hello message, wherein server hello message includes a selection of a cryptographic algorithm from the listing of cryptographic algorithms in the client hello message;
(iii) receiving a digital certificate from the server;
(iv) validating the digital certificate of the server; and
(v) transmitting a client key exchange message to the server, wherein the client exchange message sets a pre-master secret to be used for communication between the server and the secure processor.

9. The method of claim 8, wherein the client hello message, server hello message, and client key exchange message are transport layer security (TLS) protocol messages.

10. The method of claim 8, wherein the client hello message, server hello message, and client key exchange message are secure sockets layer (SSL) protocol messages.

11. The method of claim 1, further comprising:
after step (a), storing the credential in a memory within a security boundary established by the secure processor.

12. The method of claim 1, further comprising:
after step (a), encrypting the credential using a cryptographic key of the secure processor; and
storing the encrypted credential in an external memory.

13. A method for securing a credential during an attempt to access a service hosted on a server, comprising:
(a) establishing a secure connection between a secure processor and the server;
(b) establishing a secure connection between the secure processor and a computing device;
(c) receiving, in the secure processor, a credential from an authentication token; and
(d) verifying, in the secure processor, the identity of an individual attempting to use the authentication token to access the service and cryptographically verifying the server hosting the service prior to releasing the credential for transmission to the server.

14. The method of claim 13, wherein the secure connection between the secure processor and the server is established using a transport layer security (TLS) protocol.

15. The method of claim 13, wherein the secure connection between the secure processor and the computing device is established using a transport layer security (TLS) protocol.

16. The method of claim 13, wherein the secure connection between the secure processor and the server is established using a secure sockets layer (SSL) protocol.

17. The method of claim 13, wherein the secure connection between the secure processor and the computing device is established using a secure sockets layer (SSL) protocol.

18. The method of claim 13, wherein step (b) includes:
verifying authentication data entered by the individual.

19. The method of claim 18, wherein the authentication data includes a password.

20. The method of claim 18, wherein the authentication data includes a shared secret.

21. The method of claim 18, wherein the authentication data includes a biometric template of the individual.

* * * * *